(12) United States Patent
Duranton

(10) Patent No.: US 7,995,592 B2
(45) Date of Patent: Aug. 9, 2011

(54) METHOD AND DEVICE FOR TRANSMITTING INFORMATION OVER A COMPLEX NETWORK

(75) Inventor: Rene Duranton, Contigny (FR)

(73) Assignee: Edelcom, Paris (FR)

( * ) Notice: Subject to any disclaimer, the term of this patent is extended or adjusted under 35 U.S.C. 154(b) by 98 days.

(21) Appl. No.: 12/310,978

(22) PCT Filed: Sep. 11, 2007

(86) PCT No.: PCT/FR2007/001464
§ 371 (c)(1),
(2), (4) Date: May 21, 2009

(87) PCT Pub. No.: WO2008/031938
PCT Pub. Date: Mar. 20, 2008

(65) Prior Publication Data
US 2009/0310623 A1    Dec. 17, 2009

(30) Foreign Application Priority Data

Sep. 14, 2006    (FR) ...................................... 06 08059

(51) Int. Cl.
*H04L 12/28* (2006.01)
(52) U.S. Cl. ........................................ 370/401; 370/389
(58) Field of Classification Search .................. 370/389,
370/392, 401, 465, 475, 405
See application file for complete search history.

(56) References Cited

U.S. PATENT DOCUMENTS

| | | | | |
|---|---|---|---|---|
| 3,934,099 A | * | 1/1976 | Elder, Jr. .................. | 379/405 |
| 4,845,706 A | * | 7/1989 | Franaszek ................. | 370/270 |
| 5,387,902 A | | 2/1995 | Lockyer et al. | |
| 5,457,689 A | * | 10/1995 | Marvit et al. ............... | 370/449 |
| 5,799,049 A | * | 8/1998 | McFarland et al. .......... | 375/362 |
| 7,069,345 B2 | * | 6/2006 | Shteyn ........................ | 709/250 |
| 7,123,140 B1 | | 10/2006 | Denes | |
| 7,265,664 B2 | * | 9/2007 | Berkman .................. | 340/538.16 |

(Continued)

FOREIGN PATENT DOCUMENTS

EP    1 201 010 B1    3/2004

(Continued)

OTHER PUBLICATIONS

Paterson, J.H.; "The development of a street lighting fault monitoring device" *Audit Commission Recommendations*; 1991. pp. 8/1-8/3.

*Primary Examiner* — Ricky Ngo
*Assistant Examiner* — Christine Ng
(74) *Attorney, Agent, or Firm* — Oliff & Berridge, PLC

(57) ABSTRACT

The method of the invention comprises firstly prior allocation of an identifier to each module that might be concerned by the messages transmitted over the network, and when the module is installed on the network, associating said identifier with data relating to the geographical position of the location where the module is installed, in such a manner as subsequently to be able to identify the location of the module independently of its position in the network, and secondly, when sending a message over the network to a module, the modules that are capable of receiving the message, recognizing said message, and modules that have received the message systematically and synchronously repeating said message until the message has been transmitted over the entire network and all of the modules have received and re-sent the message at least once.

10 Claims, 1 Drawing Sheet

U.S. PATENT DOCUMENTS

| | | |
|---|---|---|
| 7,359,340 B2 | 4/2008 | Duranton |
| 7,573,835 B2 * | 8/2009 | Sahinoglu et al. ............ 370/255 |
| 7,593,376 B2 * | 9/2009 | D'Amico et al. ............. 370/338 |
| 7,792,126 B1 * | 9/2010 | Montestruque et al. ...... 370/400 |
| 2003/0222603 A1 | 12/2003 | Mogilner et al. |

FOREIGN PATENT DOCUMENTS

| | | |
|---|---|---|
| FR | 2 734 111 A1 | 11/1996 |
| FR | 2 804 811 A1 | 8/2001 |
| WO | WO 00/76034 A1 | 12/2000 |

\* cited by examiner

METHOD AND DEVICE FOR TRANSMITTING INFORMATION OVER A COMPLEX NETWORK

FIELD OF THE INVENTION

The present invention relates to a method and a device for transmitting information over a complex network.

The invention applies particularly, but not exclusively, to exchanging information between a plurality of modules interconnected by an electricity distribution network that is used both for electrically powering the modules and as a communications network for conveying digital messages between modules by carrier current modulation.

The invention is particularly suitable for the remote control and remote surveillance of urban lighting columns.

BACKGROUND OF THE INVENTION

In an application of this type, a central control unit and a plurality of electronic modules are connected to the network for the purposes:

firstly of making it possible to implement remote control or remote parameter setting; and secondly of transferring to a central station information that has been detected by the electronic modules.

As a general rule, an electricity distribution network presents topology that is complex, including numerous intersections that are randomly distributed. Furthermore, knowledge of the exact topology of the network has often been lost, with such a network generally being the result of successive installation operations performed over several tens of years.

Furthermore, carrier current transmission range is relatively short. It is therefore necessary for the transmitted messages to be repeated in order to enable them to reach their destinations.

In particular, the electricity distribution network presents a wide variety of impedances as a function of location and as a function of the users that are connected to the network.

Furthermore, the types of cable used (overhead, twisted, buried, single-phase, or three-phase) vary very often as a function of circumstances and the impedances per unit length specific to each type of cable, which impedances are likewise very variable.

Thus, when using the carrier current technique, in application of present standards, and insofar as it is desired to transmit data over long distances over an electricity network, it is essential to have a system for regenerating messages.

Because the impedances and attenuations are not under control, it is difficult to determine in advance which modules ought to reamplify messages.

Furthermore, if it is desired to be able to communicate with each module separately, it is necessary for each module to be given its own address.

In the context of such a network, giving each module an address raises numerous problems.

Firstly, it is necessary for the addressing mode of the various modules that are to be enabled to communicate can be applied to a network of any topology. Then, if it is desired to interconnect a large number of modules, it must be possible to perform module addressing without time-consuming operations that would involve a high risk of error. Provision must also be made for it to be easy to add a module to the network without that requiring manual intervention on other modules.

French patent No. 95/05749 proposes an addressing mode that requires manual action to be performed on each module that does not yet have an address and also on the module that does have an address and that is situated immediately upstream going towards a central unit situated at the root of the tree structure network. The address of the module that does not yet have an address is determined as a function of the address of the upstream module. That method thus presents the drawback of requiring operators to intervene on site by acting on control buttons provided on each module.

French patent No. 00/01559 proposes a method of automatically allocating addresses, in which the address of each module is determined from the address of the module situated immediately upstream, said address being sent over the network by the upstream module in an address allocation message. That method enables excellent results to be obtained, however it is difficult to implement and is not well suited to a network that is relatively complex.

OBJECT AND SUMMARY OF THE INVENTION

The invention thus has more particularly the object of solving the above-mentioned problems, and in particular the problem of regenerating the messages being transmitted and the problem relating to the addressing of the module.

To this end, the method of the invention comprises at least the following steps:

Prior allocation of an identifier to each module, such as for example the serial number of the module manufacturer, and during installation of the module in the network, associating said identifier with data relating to the geographical position of the location where the module is installed, in such a manner as to be capable subsequently of identifying the location of the module from its identifier, independently of its position in the network.

When sending a message over the network to a module and/or to the central unit, the modules connected to the network that are suitable for receiving the message recognize and/or validate said message, and modules that have recognized and/or validated the message systematically and synchronously repeat the message over the network, this repetition of messages enabling other modules to become capable of receiving the message, and after recognizing and/or validating it, of resending the message in turn: from each repetition, other modules, understand the message and are in a position to proceed with another repetition, and so on. This process repeats until the message has been transmitted over the entire network and all of the modules have received and resent the message at least once. This ensures that the message does indeed reach its destination(s).

In order to make it possible for the messages to be resent synchronously, it is essential (with the exception of amplifying technology interfaces) for the detection and sending systems of the modules to be implemented entirely on the basis of a crystal-clocked microprocessor: since analog type decoding would not make it possible to provide a satisfactory guarantee concerning message synchronism.

This synchronism can be ensured because of the high operating speed of present-day microprocessors (20 megahertz (MHz) and above). Synchronism is obtained on the basis of the instant at which the message is validated by the microprocessor located in each module.

In order to avoid any problem of message collision, the sending of messages is triggered either by the central unit or by the zone unit UZ.

The above-described method presents numerous advantages. It makes it possible in particular:

to modify the structure of the electricity network without spoiling message transmission;

to add new modules to an existing network without taking any special precautions and without having any consequences on message transmission; and to ensure that the transmitted information is available at any point of the communications network.

BRIEF DESCRIPTION OF THE DRAWINGS

An embodiment of the invention is described below by way of non-limiting example with reference to the accompanying drawing, in which.

MORE DETAILED DESCRIPTION

Figure 1:
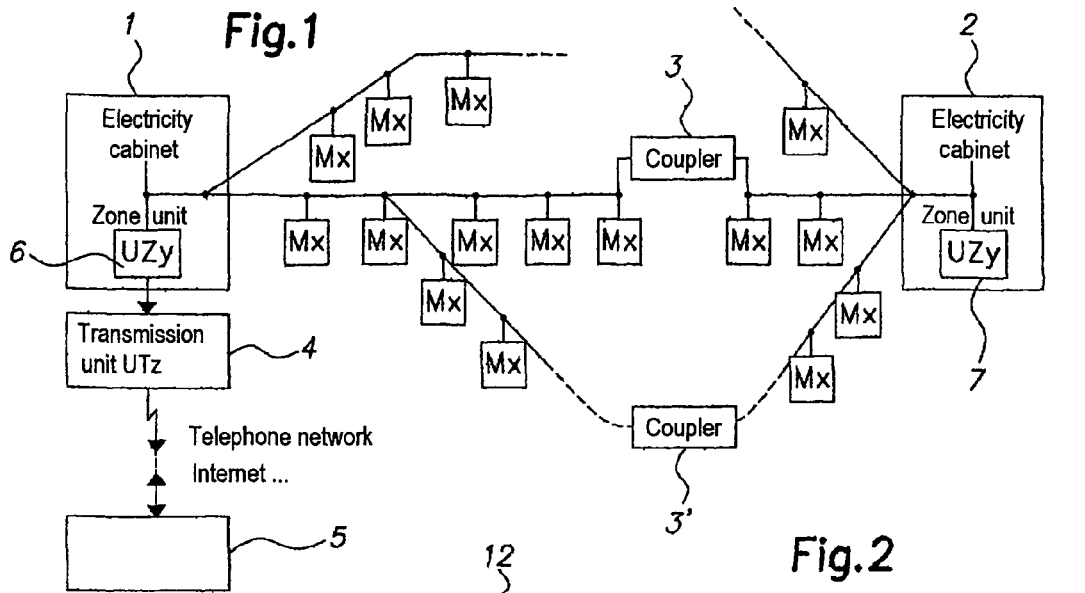
FIG. 1 is a diagram of a (public or private) electricity distribution network for lighting on which the method of the invention is implemented.

In the example shown in FIG. 1, the electricity distribution network for lighting makes use of two electricity cabinets 1, 2 each powering lighting lamps in a determined zone via a distribution network of tree structure.

In this example, the tree structure networks of two zones are interconnected by two couplers 3 and 31, thereby enabling messages to be transmitted from one zone to another while leaving the electricity networks isolated.

Naturally, the invention is not limited to a determined number of couplers. A set of zones interconnected by one or more couplers is referred to as a "sector". When a single sector has a plurality of couplers, in the event of one of the couplers failing, the other couplers take over for the sector as a whole. A sector defines the transmission network and it is generally fitted with a transmission unit $UT_z$ 4 defined by an internal number z that is associated with the cabinet 1 in this example. This transmission unit $UT_z$ 4 can send (or receive) information, (e.g. to or from) a remote processor 5, constituting a control station PC, via the telephone network, the Internet, or any other transmission network.

Furthermore, zone units UZ 6, 7 identified by respective internal numbers y are installed in the cabinets 1, 2.

The lighting lamps are controlled and monitored by control/check modules $M_x$ disposed on the lamp power supply circuits, these control/check modules having respective identifiers, each consisting in an internal number x.

Figure 2:
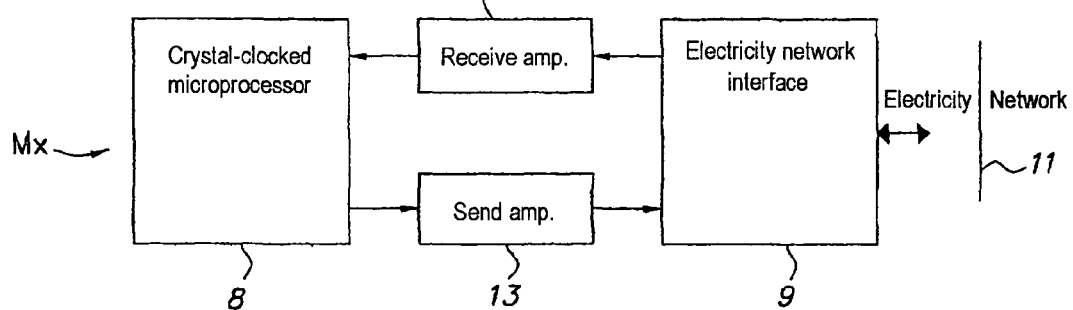
FIG. 2 is a block diagram showing the architecture of a module for controlling and monitoring the lamps used in the network shown in FIG. 1.

As shown in FIG. 2, the control/check modules $M_x$ include a crystal-clocked processor 8 connected to an electricity network interface 9 that is connected to the electricity network 11 via two circuits, namely:

a receive circuit 12 having a receive amplifier; and a transmit circuit 13 having a transmit amplifier.

The analog electronic subassemblies, in particular the electricity network interface 9 and the send and receive amplifiers 13 and 12 should make use of components that are sufficiently accurate in terms of their tolerances to ensure that there are no phase rotations that differ as a function of differing manufacturers.

Messages can be transmitted over the electricity network using a pure carrier frequency that is frequency modulated or phase modulated. Each message may be made up of the following elements:

a preamble, e.g. made up of a carrier indicating that a message is to follow;

a message order number;

the identity of the message source given by the identifier of the remote processor 5, of the transmission unit 4, of the zone unit 6, 7, or of the control/check unit $M_x$;

the internal number of the sender;

the number of the zone and, optionally, of the outgoing line;

the number of the destination or the destination group concerned (this may be all of the control/check modules $M_x$, a defined group of modules $M_x$, or even a single module $M_x$);

setpoint data, e.g. possibly relating to remote parameter setting, reduction ratios, etc., or even state data relating to a control/check module $M_x$ (which data may relate to lamp faults, for example, etc.); and message check data implementing a predetermined algorithm.

The control/check modules are designed so as to be capable of performing internal processing steps of predetermined durations on the signals conveyed over the network in order to be able to recognize and process "interesting" signals that might relate to them.

Because these interesting signals are transmitted by modulating a carrier (e.g. frequency modulation or phase modulation), the time the carrier is present must be sufficient to cover the internal processing time.

Figure 3:
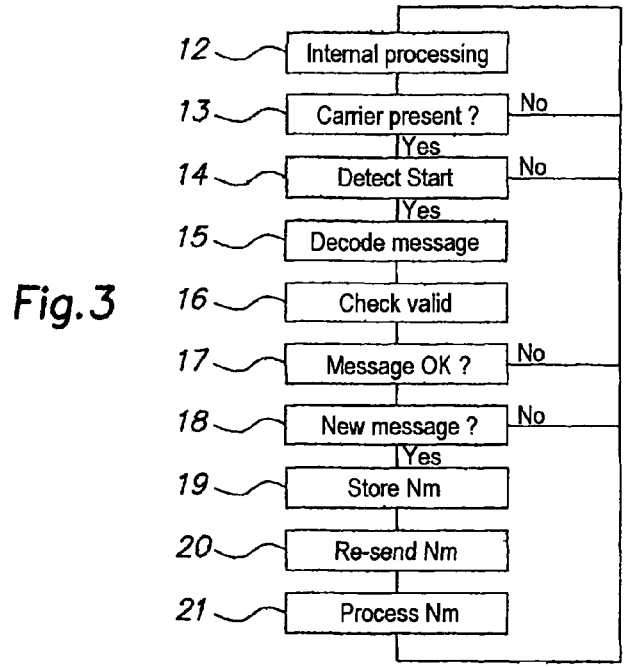
FIG. 3 is a general operation flow chart.

The operating sequence performed by the control/check modules $M_x$, during transmission over the network, is shown in FIG. 3.

It comprises the following operating stages:

an external stage of internal processing (block 12);

a stage of detecting the presence of a carrier on the network (block 13). The purpose of this stage is to recognize that the received carrier has the proper frequency, e.g. a frequency of 130 kilohertz (kHz). If no carrier is detected, the system returns to the stage 12 of executing internal treatment 12. If a carrier at the proper frequency is detected, the system moves on to the following stage;

a stage of detecting the modulation of the carrier ("start") and the beginning of the message (block 14). If no meaningful modulation is detected, the system returns to the stage 12 of executing internal processing, otherwise it goes firstly to a stage of decoding the message (block 15) and then to a stage of checking its validity (block 16);

a message validation stage (block 17). The validity of the message is checked by applying a calculation algorithm on the received data and by comparing the result that is obtained with check data that is contained in the received message. If the message is not valid, the system returns to the stage 12 of executing internal processing, otherwise the system moves onto to the following stage;

a stage of determining the existence or absence of a new message (block 18). By way of example, this stage is performed by comparison with the latest message to be stored by the module $M_x$. If nothing new is detected, the system returns to the stage 12 of executing internal processing, otherwise it moves onto the following stage;

a stage of storing the new message Nm in the memories of the module (block 19);

a stage of resending the message over the network (block 20). This stage is triggered after a precise time lapse relative to an origin that is determined by the end of the new message; and a stage of processing the new message Nm (block 21) at the end of which the system returns to the internal processing stage 12.

An advantage of the above-described method consists in that it serves to solve the problem of communication between modules mounted on multiphase distribution lines, which modules may be connected between neutral and any one of the live phases of the line.

Under such circumstances, an attenuated signal is propagated by induction over the other phases. The process of repeating the initially attenuated signal serves to obtain on the line repeated signals having the same amplitude as the signals on the phase to which the original signal was applied.

The invention claimed is:

1. A method of transmitting a message by carrier current modulation over an electrical power distribution network for public lighting lamps having connected thereto a central unit or a zone unit together with a plurality of control/check modules that might be concerned by the message, the method comprising:
   initially allocating to a module an identifier, and on installing the module in a position in the network, associating said identifier with data relating to a geographical location where the module is installed, so as to make it possible subsequently to identify the geographical location of the module from its identifier, independently of its installed position in the network; and
   when sending a message over the network to the module and/or to the central unit, recognizing and/or validating the message in the modules that are connected to the network and that are suitable for receiving the message, and systematically and synchronously repeating the message over the network by means of those modules that have recognized and/or validated the messages, this repetition of messages enabling other modules to become able to receive the message, and after recognition and/or validation, of resending the message in turn, such that from each repetition, other modules understand the message and are able to resend the message again, this process repeating until the message has been sent over the entire network and all of the modules have received the message and resent the message at least once.

2. A method according to claim 1, wherein the modules resend messages in synchronous manner, and wherein the resending is synchronized by the operating frequency of crystal-clocked microprocessors forming part of said modules.

3. A method according to claim 2, wherein the resending of messages is synchronized on the basis of the instant at which the message is found to be valid by the microprocessor located in each module.

4. A method according to claim 1, wherein message sending is triggered by the central unit or by a zone unit.

5. A method according to claim 1, wherein said modules are control/check modules of the public lighting lamps.

6. A method according to claim 5, wherein the control/check modules comprise a crystal-clocked processor connected to a network interface that is connected to the electricity power distribution network via two circuits, comprising:
   a receive circuit having a receive amplifier; and
   a second circuit having a send amplifier.

7. A method according to claim 5, wherein the electricity power distribution network makes use of electricity cabinets, each cabinet powering lighting lamps in a determined zone via a distribution network having a tree structure, tree structure networks of different zones being capable of being interconnected by couplers enabling messages to be sent from one zone to another while leaving the electricity power distribution networks mutually isolated, the zones connected together by one or more couplers constituting a sector having a transmission unit identified by an internal number associated with the cabinets, said transmission unit being capable of communicating with a remote processor, and wherein each message comprises:
   a preamble;
   a message order number;
   an identity of an origin of the message relying on an identifier of the remote processor, of the transmission unit, of the zone unit, or of the module;
   an internal number of a sender;
   a zone number and, optionally, an outgoing line number;
   a number of a destination or destination group concerned;
   setpoint data; and
   check data for checking the message using a predetermined algorithm.

8. A method according to claim 1, wherein an operating sequence executed by the module comprises the following operations:
   a first stage of executing internal processing;
   a second stage of detecting a presence of a carrier on the network, and returning to the first stage in an absence of the carrier, otherwise moving on to a third stage;
   the third stage of detecting carrier modulation and a beginning of the message, returning to the first stage if no meaningful modulation is detected, otherwise moving on to a stage of decoding the message and then on to a stage of checking the validity of the message;
   a fourth stage of validating the message and returning to the second stage if the message is not valid, otherwise moving on to a following stage;
   a fifth stage of determining an existence or an absence of a new message, returning to the first stage if no new message is detected, otherwise moving on to a next stage;
   a sixth stage of storing the new message in a memory of the module;
   a seventh stage of resending the message over the network, this stage being triggered after an accurate time lapse from an origin determined by an end of the new message; and
   an eighth stage of processing the new message.

9. A method of transmitting a message by carrier current modulation over an electrical power distribution network for public lighting lamps having connected thereto a central unit or a zone unit together with a plurality of control/check modules that might be concerned by the message, the method comprising:
   initially allocating to a module an identifier, and on installing the module in a position in the network, associating said identifier with data relating to a geographical location where the module is installed, so as to make it possible subsequently to identify the geographical location of the module from its identifier, independently of its installed position in the network; and
   when sending a message over the network to the module and/or to the central unit, recognizing and/or validating the message in the modules that are connected to the network and that are suitable for receiving the message, and systematically and synchronously repeating the message over the network by means of those modules that have recognized and/or validated the messages, this repetition of messages enabling other modules to become able to receive the message, and after recognition and/or validation, of resending the message in turn, such that from each repetition, other modules understand the message and are able to resend the message again, this process repeating until the message has been sent over the entire network and all of the modules have received the message and resent the message at least once, wherein:

said network is an electricity power distribution network for public lighting lamps, and wherein said modules are control/check modules of the lighting lamps, and the electricity power distribution network makes use of electricity cabinets, each cabinet powering lighting lamps in a determined zone via a distribution network having a tree structure, tree structure networks of different zones being capable of being interconnected by couplers enabling messages to be sent from one zone to another while leaving the electricity power distribution networks mutually isolated, the zones connected together by one or more couplers constituting a sector having a transmission unit identified by an internal number associated with the cabinets, said transmission unit being capable of communicating with a remote processor, and wherein each message comprises:

a preamble;

a message order number;

an identity of an origin of the message relying on an identifier of the remote processor, of the transmission unit, of the zone unit, or of the module;

an internal number of a sender;

a zone number and, optionally, an outgoing line number;

a number of a destination or destination group concerned;

setpoint data; and check data for checking the message using a predetermined algorithm.

10. A method of transmitting a message by carrier current modulation over an electrical power distribution network for public lighting lamps having connected thereto a central unit or a zone unit together with a plurality of control/check modules that might be concerned by the message, the method comprising at least the following steps:

initially allocating to a module an identifier, and on installing the module in a position in the network, associating said identifier with data relating to a geographical location where the module is installed, so as to make it possible subsequently to identify the geographical location of the module from its identifier, independently of its installed position in the network; and when sending a message over the network to the module and/or to the central unit, recognizing and/or validating the message in the modules that are connected to the network and that are suitable for receiving the message, and systematically and synchronously repeating the message over the network by means of those modules that have recognized and/or validated the messages, this repetition of messages enabling other modules to become able to receive the message, and after recognition and/or validation, of resending the message in turn, such that from each repetition, other modules understand the message and are able to resend the message again, this process repeating until the message has been sent over the entire network and all of the modules have received the message and resent the message at least once, wherein an operating sequence executed by the module comprises the following operations:

a first stage of executing internal processing;

a second stage of detecting a presence of a carrier on the network, and returning to the first stage in an absence of the carrier, otherwise moving on to a third stage;

the third stage of detecting carrier modulation and a beginning of the message, returning to the first stage if no meaningful modulation is detected, otherwise moving on to a stage of decoding the message and then on to a stage of checking the validity of the message;

a fourth stage of validating the message and returning to the second stage if the message is not valid, otherwise moving on to a following stage;

a fifth stage of determining an existence or an absence of a new message, returning to the first stage if no new message is detected, otherwise moving on to a next stage;

a sixth stage of storing the new message in a memory of the module;

a seventh stage of resending the message over the network, this stage being triggered after an accurate time lapse from an origin determined by an end of the new message; and an eighth stage of processing the new message.

* * * * *